United States Patent
Pebley et al.

(10) Patent No.: US 9,662,959 B2
(45) Date of Patent: May 30, 2017

(54) BLOWER CONTROL FOR VEHICLE WITH START-STOP ENGINE

(71) Applicant: FORD GLOBAL TECHNOLOGIES, LLC, Dearborn, MI (US)

(72) Inventors: Kirk R. Pebley, Novi, MI (US); James C. Rollinson, Superior Township, MI (US); Eric M. Rademacher, Royal Oak, MI (US); Ranganathan Madhavan, Canton, MI (US); Manfred Koberstein, Troy, MI (US); Wayne F. Buescher, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 1049 days.

(21) Appl. No.: 13/710,823

(22) Filed: Dec. 11, 2012

(65) Prior Publication Data
US 2014/0157802 A1    Jun. 12, 2014

(51) Int. Cl.
*B60H 1/00*      (2006.01)

(52) U.S. Cl.
CPC ..... *B60H 1/00457* (2013.01); *B60H 1/00778* (2013.01); *B60H 1/00828* (2013.01)

(58) Field of Classification Search
CPC ............ B60H 1/00828; B60H 1/00642; B60H 1/00428; B60H 1/00421
USPC .......................................................... 62/186
See application file for complete search history.

(56) References Cited

U.S. PATENT DOCUMENTS

| | | | | |
|---|---|---|---|---|
| 2,729,989 | A * | 1/1956 | McCue James H | 76/89.2 |
| 5,330,385 | A | 7/1994 | Hotta et al. | |
| 5,516,041 | A * | 5/1996 | Davis et al. | 236/49.3 |
| 5,553,776 | A * | 9/1996 | Davis et al. | 236/49.3 |
| 5,721,550 | A | 2/1998 | Lopez | |
| 5,983,649 | A * | 11/1999 | Aislabie et al. | 62/133 |
| 5,988,517 | A * | 11/1999 | Bauer et al. | 236/49.3 |
| 6,052,998 | A * | 4/2000 | Dage et al. | 62/89 |
| 6,116,511 | A * | 9/2000 | Jakobcic et al. | 236/49.3 |
| 6,545,438 | B1 * | 4/2003 | Mays, II | 318/400.01 |
| 6,889,762 | B2 | 5/2005 | Zeigler et al. | |
| 6,895,917 | B2 | 5/2005 | Itoh et al. | |
| 7,007,856 | B2 | 3/2006 | La Falce et al. | |
| 7,562,535 | B2 | 7/2009 | Deiml et al. | |
| 8,160,804 | B2 | 4/2012 | Chominsky et al. | |
| 8,301,335 | B2 * | 10/2012 | Hill et al. | 701/36 |
| 8,561,915 | B2 * | 10/2013 | Ishida et al. | 237/12.3 R |
| 2002/0002833 | A1 * | 1/2002 | Klapp et al. | 62/203 |
| 2002/0162342 | A1 * | 11/2002 | Weng et al. | 62/156 |
| 2004/0144107 | A1 | 7/2004 | Breton et al. | |
| 2006/0248907 | A1 * | 11/2006 | Allen et al. | 62/183 |

(Continued)

*Primary Examiner* — Ljiljana Ciric
*Assistant Examiner* — Alexis Cox
(74) *Attorney, Agent, or Firm* — Raymond L. Coppielle; MacMillan, Sobanski & Todd, LLC (57) ABSTRACT

A method and apparatus for controlling blower speed of an air conditioning system in a vehicle having a start/stop engine. When an auto stop event of the start/stop engine is entered, an ambient temperature and a second temperature (e.g., evaporator) of the air conditioning system are measured by sensors. A first cutback limit is determined in response to the ambient temperature. The blower speed is ramped to the first cutback limit by a controller. The engine is restarted and the blower speed is restored in response to the second temperature reaching a restart threshold.

17 Claims, 5 Drawing Sheets

(56) References Cited

U.S. PATENT DOCUMENTS

| | | | |
|---|---|---|---|
| 2008/0066476 A1* | 3/2008 | Zhu et al. | 62/133 |
| 2008/0103635 A1* | 5/2008 | Vuk et al. | 700/300 |
| 2010/0138139 A1* | 6/2010 | Gibert et al. | 701/112 |
| 2010/0236770 A1 | 9/2010 | Pursifull | |
| 2010/0274394 A1 | 10/2010 | Wijaya et al. | |
| 2012/0304670 A1* | 12/2012 | Kumar et al. | 62/61 |
| 2014/0338882 A1* | 11/2014 | Rollinson et al. | 165/203 |

* cited by examiner

BLOWER CONTROL FOR VEHICLE WITH START-STOP ENGINE

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to automatic control of an HVAC blower speed during shutoff of a start/stop engine in a motor vehicle.

Fuel economy of automobiles is an important attribute of vehicle performance which is determined by the technologies employed in the vehicle design, by driver behavior and actions, and by conditions under which the vehicle is used (e.g., speed, road design, weather, and traffic). Manufacturers continuously strive to deliver better fuel economy. One technology being increasingly used is known as automatic Start-Stop technology, wherein an internal combustion engine automatically shuts down when the vehicle comes to a stop or coasts and then restarts as needed to continue driving. The reduction in the amount of time the engine spends idling (e.g., while waiting at a traffic light) results in improved fuel economy and reduced emissions. According to some estimates, start-stop technology can provide a 5% to 10% improvement in fuel economy or more.

In addition to vehicle propulsion, the combustion engine drives other vehicle systems such as an air conditioning compressor. Occupant comfort must be maintained during the time that the engine is stopped. Since the air conditioning compressor typically runs on a front-end-accessory-drive (FEAD) belt driven by the engine, the conventional compressor does not run when the engine is stopped. Thus, when the air conditioning system is actively being used and the engine stops during an idle condition, the cooling action is interrupted and the passenger cabin may become warmer. If the cabin temperature increases by a certain amount, the engine is usually restarted so that cooling resumes, but some of the fuel economy improvement may be lost. One example of a strategy for controlling the engine off time is provided in commonly assigned, co-pending application U.S. Ser. No. 13/561,328, filed Jul. 30, 2012, entitled "Engine Start-Stop Control Strategy for Optimization of Cabin Comfort and Fuel Economy," which is incorporated herein by reference in its entirety.

In attempting to lengthen the time span until it becomes necessary to resume operation of the air conditioning system, the use of cold storage systems has been considered. In one type of cold storage system, an evaporator may incorporate a phase change material that gives off heat (e.g., freezes) during normal operation before a stop event and then absorbs heat by changing back to a liquid phase during the stop event. However, cold storage devices are expensive, are difficult to package due to their larger size, and require additional controls. Moreover, since they consume additional energy during engine operation, the fuel economy improvement is lessened.

Another approach for providing air conditioning while the combustion engine is off involves the use of an electric compressor running off stored electrical energy from a battery. In a typical gasoline-powered vehicle, however, the expense of such an auxiliary air conditioning system is usually prohibitive. Even in a hybrid vehicle (i.e., having both a combustion engine and an electric propulsion system), the additional use of the electric compressor would result in the loss of fuel economy. Thus, it would be desirable to maintain passenger comfort with longer engine off times without relying on cold storage or backup cooling systems.

SUMMARY OF THE INVENTION

In one aspect of the invention, a method is provided for controlling blower speed of an air conditioning system in a vehicle having a start/stop engine. A stop event is entered and an ambient temperature and a second temperature of the air conditioning system are measured. A first cutback limit is determined in response to the ambient temperature. The blower speed is ramped to the first cutback limit. The engine is restarted and the blower speed is restored in response to the second temperature reaching a restart threshold.

DETAILED DESCRIPTION OF PREFERRED EMBODIMENTS

Figure 1:
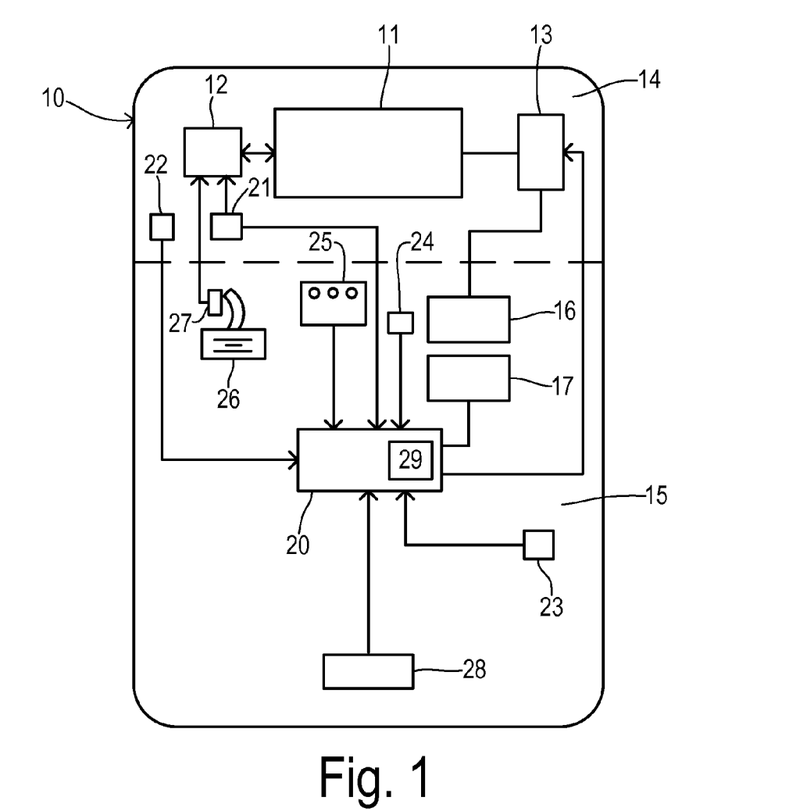
FIG. 1 is a block diagram showing a vehicle configured to employ various embodiments of the present invention.

Referring now to FIG. 1, a vehicle 10 includes a combustion engine 11 equipped with the start-stop feature wherein the engine can be automatically shut down during times when the engine would otherwise be idling (e.g., when vehicle is not moving) and then automatically restarted as necessary when the vehicle begins to move again or when it becomes necessary to operate accessories off of the engine (such as the air conditioning compressor). An engine controller 12 is connected to engine 11 for performing the start-stop functions. Engine 11 drives a compressor 13 which resides in an engine compartment 14 along with engine 11 and controller 12.

Vehicle 10 includes a passenger cabin 15 which contains an evaporator 16 and a blower 17 of an automotive HVAC system. Blower 17 includes a variable speed electric motor driving a blower fan wheel that creates a desired air flow. A controller 20 is connected to blower 17 for commanding a certain blower speed and to compressor 13 (e.g., for commanding a desired stroke of a variable displacement compressor). Controller 20 is connected to a plurality of sensors and receives other input signals for coordinating operation of the HVAC system (e.g., determining a blower speed or an appropriate value for the compressor stroke). A vehicle speed sensor 21 provides an instantaneous speed signal to controller 20 and to engine controller 12. An exterior temperature sensor 22 (which may be located in engine compartment 14) generates an exterior temperature signal according to a temperature outside of the vehicle and couples the resulting signal to controller 20. Similarly, an internal comfort sensor 23 generates signal(s) identifying comfort parameters such as an internal temperature signal and/or an internal humidity signal, and provides the signal(s) to controller 20. An evaporator temperature sensor 24 associated with evaporator 16 generates an evaporator temperature signal according to an actual temperature within the evaporator and provides it to controller 20.

An occupant control element or control head 25 is used by the driver or other vehicle occupant to set a desired temperature and/or blower speed for the cooling of vehicle cabin 15. Control element 25 generates an occupant demand signal which is sent to controller 20 in a conventional manner. A sunload sensor 28 such as a light intensity sensor provides a sunload signal to controller 20. Controller 20 includes a lookup table 29. Based on the various inputs to controller 20, it automatically controls blower speed during a stop event according to the inputs which may be used to determine speed values using lookup table 29.

An automatic stop-event is initiated by engine controller 12 under certain conditions, such as the vehicle slowing to a stop. Such an event can be detected in response in part to the occurrence of a deceleration. In one embodiment, the deceleration is detected by monitoring the position of a brake pedal 26 using an angle/position sensor 27 that provides an angle signal representing the instantaneous brake pedal angle to controller 20.

The decision on whether to initiate a stop event may depend upon whether the HVAC system is turned on and whether it has managed to approach the desired temperature setpoint. For example, if the air conditioning is turned on but the temperature is more than a predetermined number of degrees above the desired setpoint because the HVAC has only been running for a short time, then an auto engine stop event is not initiated even though the vehicle has come to a stop. Controller 20 may be coupled with engine controller 12 via a multiplex bus (not shown) in order to provide the necessary information to make a decision. When the HVAC system is at or near a steady state of operation, then the initiation of an auto stop event would not be prevented.

Once an auto stop event is initiated with the HVAC in air conditioning mode, compressor 13 is no longer driven by the engine. Consequently, evaporator 16 no longer receives cold refrigerant. Nevertheless, evaporator 16 is sufficiently colder than the air of the passenger cabin that it is beneficial to continue to circulate air from the blower and obtain whatever cooling potential may remain. Eventually, however, the evaporator temperature rises to a level at which no cooling of the cabin occurs. Rising temperature causes discomfort for the passengers. Furthermore, increased cabin humidity and a musty odor may result. Therefore, the evaporator temperature has been monitored so that the engine can be restarted before the evaporator temperature becomes too high.

Figure 2:
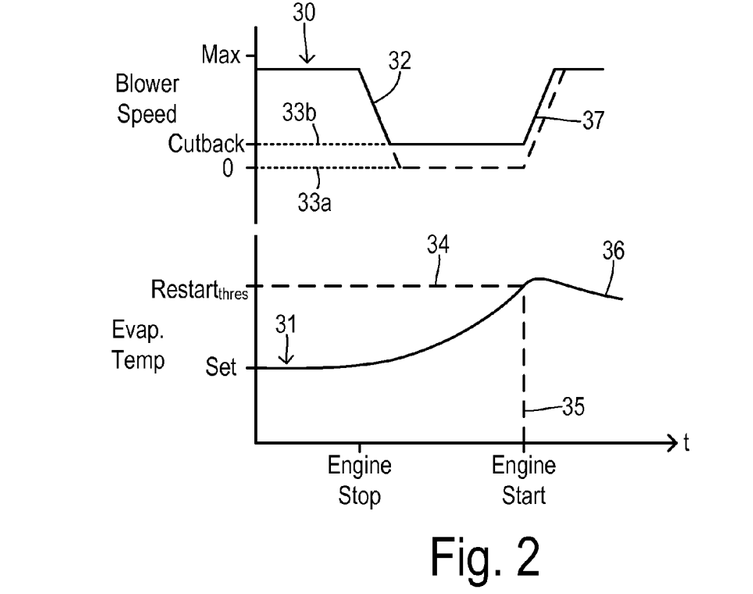
FIG. 2 is a graph depicting a modified blower speed during an auto stop event for a first embodiment of the invention.

In order to reduce energy use during a stop event and to avoid overly rapid warming of the evaporator, the invention automatically adopts a slower (i.e., cutback) speed for operating the blower during the stop event as shown in FIG. 2. Rather than always switching to some fixed speed value, the present invention detects climatic conditions and determines an appropriate cutback speed that maintains passenger comfort while optimizing the engine stop time.

A line 30 illustrates an example progression of blower speed between an initial blower speed and a cutback speed. Evaporator temperature is shown along a line 31. The HVAC system maintains the evaporator temperature near a setpoint during steady state operation of providing A/C cooling of the cabin air. An engine stop event occurs at the time indicated in FIG. 2, with the result that the air conditioning compressor stops operating and the evaporator temperature gradually begins to rise. In response to the auto stop event, blower speed is ramped down along a segment 32 to a cutback speed 33. Depending on the climatic conditions, the value selected for the cutback speed may be zero (blower off) at 33a or a relatively low speed at 33b. Cutback speed 33 is sufficient to maintain passenger comfort for a reasonable time while avoiding rapid warming of the evaporator that would be associated with a faster blower speed. As the stop event continues, evaporator temperature rises until it reaches a restart threshold 34, at which time an engine start event 35 occurs so that compressor operation is restored and the evaporator temperature can begin to decline as shown at 36. Once the engine restarts, blower speed is returned to its original level via a ramping up at 37.

Figure 3:
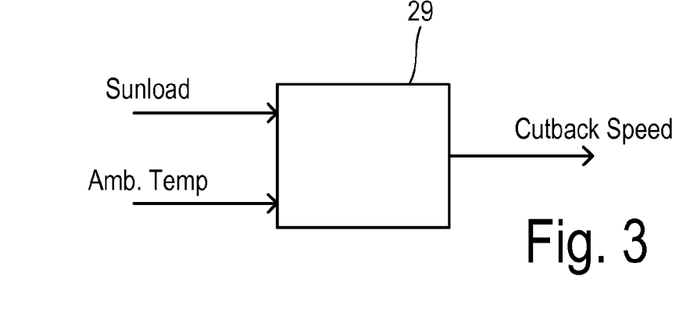
FIG. 3 shows a lookup table for determining a cutback speed.

An appropriate value for the cutback speed can be selected using a lookup table 29 as shown in FIG. 3. Climatic conditions that determine how much the blower speed can be reduced without noticeably warming the passengers include outside ambient temperature and sunload. A higher ambient temperature and a higher sunload each contribute to a faster warming of the passenger cabin. Calibrated values for the cutback speed are stored in lookup table 29. During operation, the controller inputs the measured values for ambient temperature and sunload into table 29, resulting in an optimum value for the cutback speed.

Figure 4:
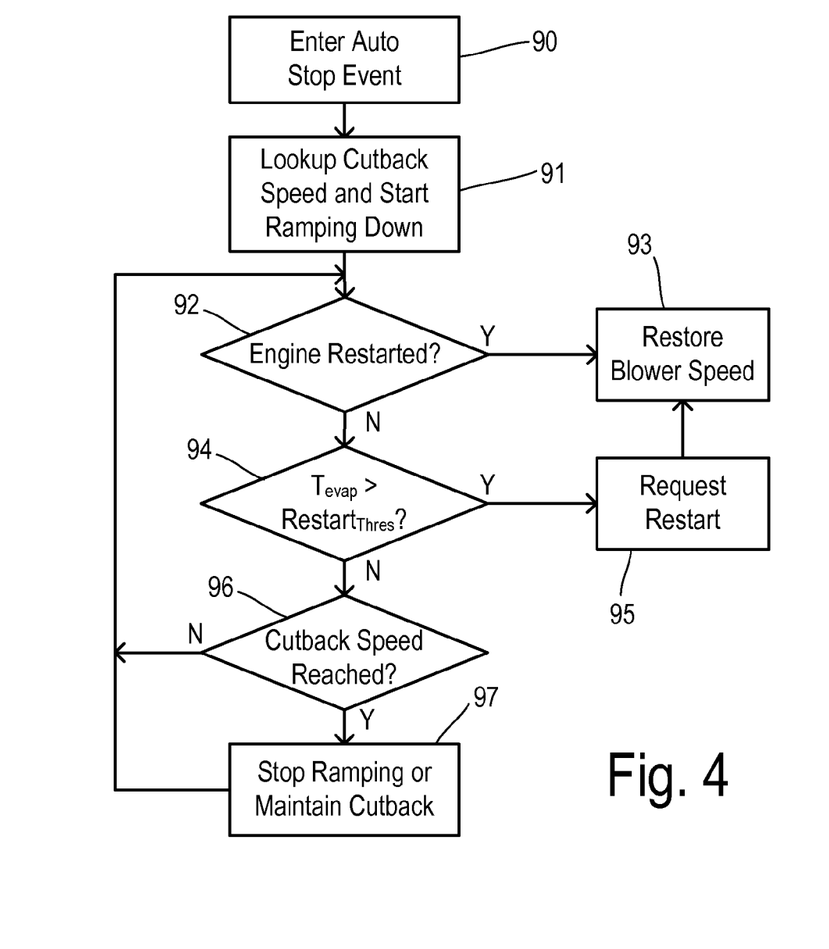
FIG. 4 is a flowchart of a method corresponding to FIG. 2.

One preferred method of the invention is shown in FIG. 4. An auto stop event is entered in step 90. The HVAC controller looks up a cutback speed based on ambient temperature and/or sunload in step 91 and starts ramping down the blower speed toward the cutback speed. The ramping rate may be fairly slow so that it is not distracting to the passengers and so that air flow is mostly maintained in the event of a very short stop event. A check is made in step 92 to determine if the engine has restarted. If so, then the blower speed is restored to its initial value in step 93. Otherwise, a check is made in step 94 to determine whether a temperature of the air conditioning system (preferably evaporator temperature $T_{evap}$) has risen to a restart threshold ($Restart_{thres}$). If so, then a request for an engine restart is sent to the engine controller is step 95 and blower speed is restored in step 93.

If $T_{evap}$ is still cold enough, then a check is made in step 96 to determine if the cutback speed has been reached. If not, then the ramp down continues and the method returns to check the conditions in steps 92 and 94. If the cutback speed has been reached, then ramping is stopped or the cutback speed is maintained in step 97.

Figure 5:
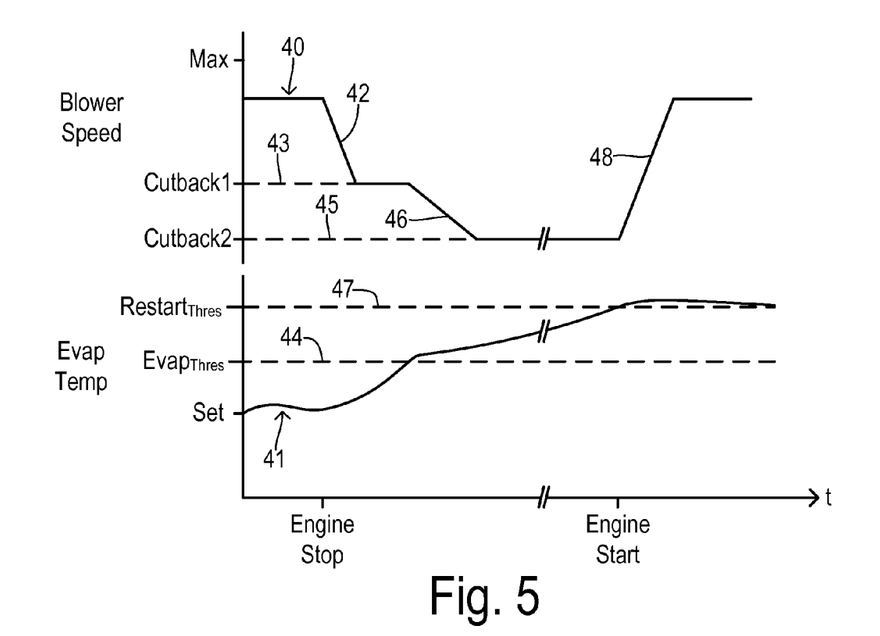
FIG. 5 is a graph depicting modifications to blower speed according to another embodiment of the present invention.

Operation of an alternative embodiment of the invention with a stepped reduction of blower speed is shown in FIG. 5 wherein a plot 40 represents blower speed and a plot 41 represents evaporator temperature. Blower speed initially operates at an arbitrary speed (up to a maximum) that may be manually set by the driver or automatically controlled by the HVAC system. If the blower speed is above a first limit 43 (Cutback1), then upon the occurrence of an engine stop event the blower speed ramps down to the Cutback1 limit along a segment 42. Speed ramps down at a first ramping rate which is chosen so that the change is not distracting to the passengers. Cutback1 may be either 1) a predetermined fixed speed, or 2) selected based on ambient temperature and/or sunload. The fixed or selected speed is adapted to give more emphasis to passenger comfort than extended stop time, so that the cooling air flow is only modestly changed during stop events having a short duration.

With the engine stopped, evaporator temperature gradually increases until it passes an evaporator temperature threshold (Evap$_{Thres}$) 44. The controller detects the increase in evaporator temperature and consequently ramps down the blower speed to an even lower limit 45 (Cutback2) at a second ramping limit along a segment 46. The second ramping rate may be the same as the first ramping rate, but is preferably slower than the first ramping rate since the vehicle has likely stopped moving, thereby requiring a more gradual change to avoid distraction.

The Cutback2 limit may correspond to a zero blower speed or a very low blower speed, for example. The present invention lowers the blower speed in a stepwise fashion in order to best maintain passenger comfort during shorter stop events while extending the time of evaporator warming in longer stop events. By maintaining use of a more moderate cutback limit during a brief initial time period, increased air flow is maintained during shorter stops in which evaporator temperature would not have enough time to reach the restart threshold anyway. However, once the evaporator temperature reaches Evap$_{thres}$ a slower increase in the evaporator temperature is obtained using a further reduction of the blower speed. When evaporator temperature eventually does reach the restart threshold (Restart$_{Thres}$) 47 then blower speed is ramped back up at segment 48.

Figure 6:
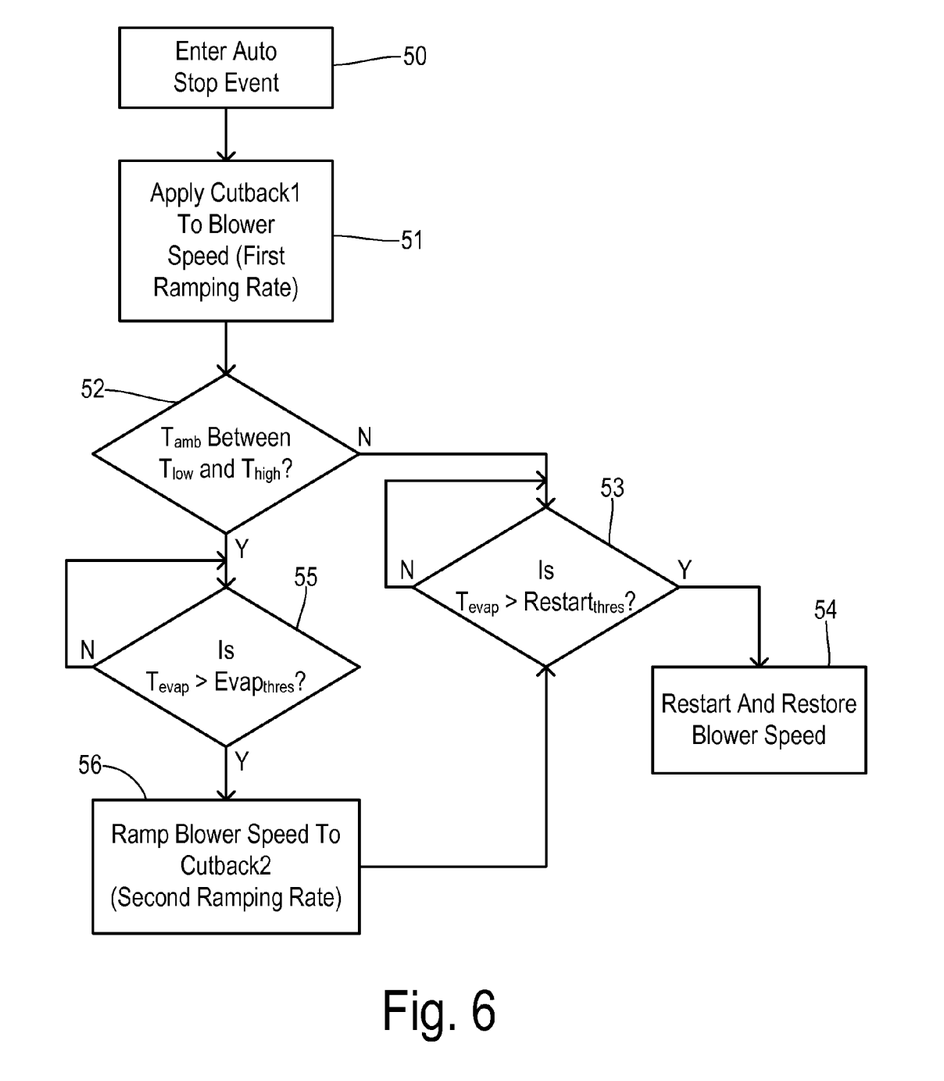
FIG. 6 is a flowchart of a method corresponding to FIG. 5.

FIG. 6 is a flowchart of a method corresponding to the embodiment of FIG. 5. In step 50, the engine controller enters an auto stop event. The Cutback1 limit is applied to the blower speed in step 51 using the first ramping rate. In step 52, a check is made to determine whether ambient temperature is between a low temperature threshold and a high temperature threshold. The high temperature threshold may indicate a hot external condition in which the passengers may quickly become uncomfortable without continued operation of the air conditioning system. The low temperature threshold may be useful for determining whether the HVAC system is primarily providing warming of the passenger cabin (i.e., not in air conditioning mode). In one embodiment, the high temperature threshold may correspond to about 28° C. and the lower temperature threshold may correspond to about 10° C. Preferably, the range of temperatures includes a comfortable room temperature of about 22° C. If ambient temperature is outside this comfortable temperature range, then a further reduction in blower speed is not initiated. Instead, a check is made in step 53 to determine whether evaporator temperature exceeds the restart threshold. Once it exceeds the threshold, the engine is restarted and the blower speed is restored to its original speed in step 54.

When step 52 finds that ambient temperature is within the comfortable ambient temperature range, the blower speed is maintained at the Cutback1 limit while periodically checking whether evaporator temperature has risen above the evap threshold in step 55. After the evap threshold is reached, blower speed is ramped down to a Cutback2 limit in step 56 at the second ramping rate. The value of Cutback2 may be a fixed value (e.g., zero or a very slow speed, or may be determined from climatic conditions). From then on, evaporator temperature is compared with the restart threshold in step 53.

Figure 7:
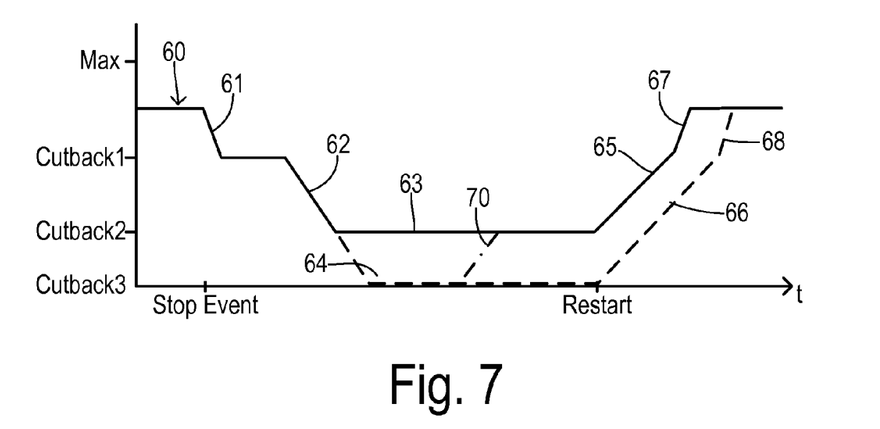
FIG. 7 is a graph depicting modifications to blower speed according to yet another embodiment of the invention.

FIG. 7 illustrates a third embodiment wherein a plot 60 representing blower speed may adopt several different cutback limits Thus, upon the occurrence of the stop event, the blower speed is decreased to the Cutback1 limit at 61. When the evaporator temperature reaches the evap threshold then blower speed is decreased at 62 to either Cutback2 or Cutback3, shown at 63 and 64, respectively. Although it is more preferable to adopt a cutback limit as low as possible (e.g., a zero level at Cutback3), some climatic conditions could be present in which even a very small amount of air circulation may be beneficial for passenger comfort. Thus, the particular cutback limit to be followed may be determined based on detecting a passenger comfort parameter such as cabin humidity, cabin temperature, ambient temperature, sunload, or some combination of these. For example, for a cabin humidity above a predetermined threshold, a non-zero Cutback2 limit may be selected. The selected cutback limit may remain in effect until a restart event at which time the blower speed ramps up to the speed it had prior to the stop event. A ramping rate may be employed with the slower ramping rate up to the first cutback limit as shown at 65 and 66, and then continuing at the higher ramping rate as shown at 67 and 68. Alternatively, a faster ramping rate can be used for the entire time of increase. In another alternative, changes in the passenger comfort parameter could be detected that result in switching between cutback limits as shown at 70.

Figure 8:
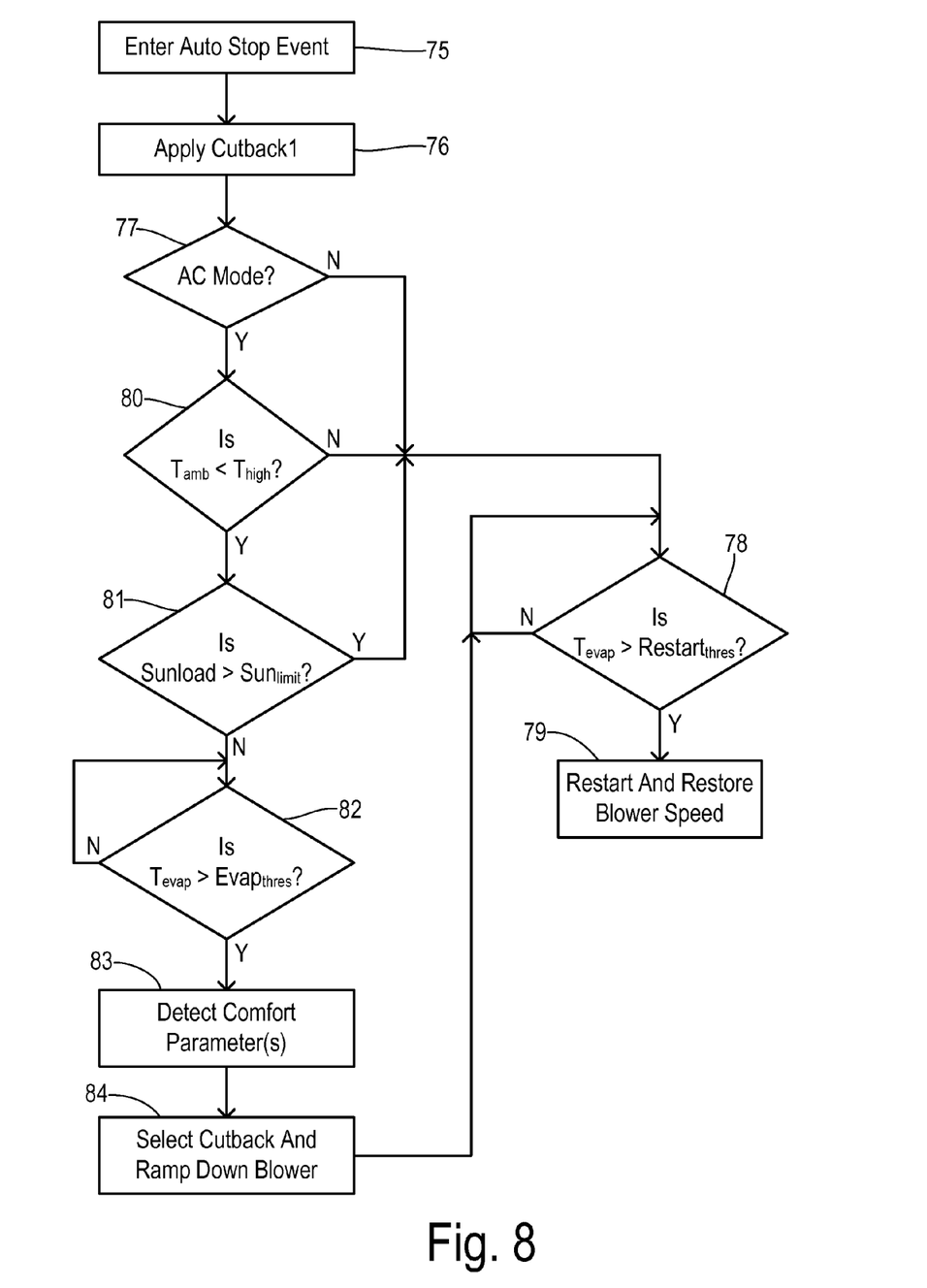
FIG. 8 is a flowchart of a method for providing the blower speed modifications shown in FIG. 7.

An alternative method with the stepped selection of cutback limit values is shown in FIG. 8. An auto stop event is entered at step 75, and the Cutback1 blower speed limit is applied in step 76. A check may optionally be performed in step 77 to determine whether the air conditioning system is in AC mode. If not, then Cutback1 continues to be used while a check is made in step 78 to determine whether evaporative temperature has reached the restart threshold. Once the evaporator temperature rises above the restart threshold then the auto stop event is terminated in step 79 (i.e., the engine is restarted and the blower speed is restored to its previous value).

If in AC mode, then a check is made in step 80 to determine whether ambient temperature is below the upper temperature threshold. If not, then the Cutback1 limit continues to be applied while evaporator temperature is compared to the restart threshold in step 78. Otherwise, a check is made in step 81 to determine whether the sunload is greater than a sunload limit threshold (Sun$_{limit}$). Excessive sunload indicates that passenger comfort can only be maintained by continuing to apply the Cutback1 blower speed limit. The method continues checking evaporator temperature against the restart threshold in step 78.

If sunload is not excessive, then evaporator temperature is compared with the evap threshold in step 82. Once evaporator temperature reaches the evap threshold, then one or more comfort parameters are detected in step 83 so that a cutback limit can be selected in step 84 and the blower speed is ramped down to the selected cutback limit Using this lower cutback limit, the method returns to step 78 for monitoring for the need of a restart.

In embodiments using a plurality of cutback limits, one of the potential values is preferably equal to zero, while another value may be preferably equal to the lowest operative speed at which the blower can be maintained. Thus, depending upon the climatic conditions, the period of time until the evaporator temperature has risen to the restart threshold can be significantly lengthened and fuel economy increased.

What is claimed is:

1. A method of controlling blower speed of an air conditioning system in a vehicle having a start/stop engine, comprising, in order:
    entering an engine stop event;
    measuring an outside temperature and an evaporator temperature;
    determining first cutback limit in response to the outside temperature;
    in response to the blower speed exceeding the first cutback limit, ramping down blower speed to the first cutback limit; and
    restarting the engine and restoring the blower speed in response to evaporator temperature reaching a restart threshold.

2. The method of claim 1, further comprising the steps, in order, of:
    after ramping the blower speed to the first cutback limit, comparing evaporator temperature to a second threshold;
    in response to the evaporator temperature being above the second threshold, then further reducing ramping down the blower speed to a second cutback limit.

3. The method of claim 2 wherein the second cutback limit is comprised of a fixed speed.

4. The method of claim 3 wherein the fixed speed is zero.

5. The method of claim 2 further comprising the step of determining the second cutback limit in response to the outside temperature.

6. The method of claim 2 further comprising the steps of measuring a sunload; and
    determining the second cutback limit in response to the sunload.

7. The method of claim 2 further comprising the steps of:
    measuring a passenger comfort parameter; and
    determining the second cutback limit in response to the passenger comfort parameter.

8. The method of claim 1 further comprising the step of measuring a sunload, wherein the first cutback limit is further determined in response to the sunload.

9. The method of claim 1, further comprising the steps, in order, of:
    after ramping the blower speed to the first cutback limit, comparing the air conditioning system evaporator temperature to a second threshold;
    measuring a sunload;
    in response to the air conditioning system evaporator temperature being above the second threshold and the sunload being below a sunload threshold then further reducing the blower speed to a second cutback limit lower than the first cutback limit.

10. An air conditioning system for a vehicle having a start/stop engine, comprising:
    a blower motor for driving a blower fan according to a variable blower speed;
    an evaporator for receiving an air flow driven by the blower fan;
    a plurality of sensors for measuring an external ambient temperature and an evaporator temperature, wherein at least one of the plurality of sensors is an external ambient temperature, and wherein at least one of the plurality of sensors is an evaporator temperature sensor; and
    a controller coupled to the blower motor and the plurality of sensors for setting the blower speed according to the steps, in order, of:
    detecting entry to an automatic stop event of the engine;
    in response to the blower speed being above a first cutback limit, ramping the blower speed to the first cutback limit;
    comparing the evaporator temperature to a restart threshold, and in response to the evaporator temperature being above the restart threshold, then initiating a termination of the automatic stop event;
    in response to the evaporator temperature being below the restart threshold, then comparing the ambient temperature to a temperature threshold, and in response to the ambient temperature being less than the temperature threshold, then:
    compares the evaporator temperature to an arrest threshold; and
    in response to the evaporator temperature rising above the arrest threshold, then ramping the blower speed to an arrested limit, wherein the arrested limit is lower than the first limit.

11. The system of claim 10 wherein the controller stores an operating value of blower speed that was in effect prior to applying the first limit, and wherein after the step of initiating a termination of the automatic stop event the controller returns the blower speed to the operating value of blower speed that was in effect prior to applying the first limit.

12. The system of claim 10, wherein the plurality of sensors further includes a sunload sensor which measures a sunload on the vehicle, and wherein the controller does not reduce the blower speed to the arrested limit in response to the sunload being greater than a sunload threshold.

13. The system of claim 10 wherein the arrested limit is comprised of a speed of zero.

14. The system of claim 10 wherein the controller applies the first limit by lowering the blower speed at a first ramp rate, and wherein the controller applies the arrested limit by lowering the blower speed at a second ramp rate that is slower than the first ramp rate.

15. The system of claim 10 wherein the plurality of sensors further includes a sensor which measures a passenger comfort parameter, and wherein the controller selects one of a plurality of values for the arrested limit of the blower speed in response to the passenger comfort parameter.

16. The system of claim 15 wherein the plurality of sensors further includes a humidity sensor which measures a humidity, wherein the passenger comfort parameter is comprised of the measured humidity, and wherein one of the plurality of values is zero.

17. A method of controlling blower speed of an air conditioning system in a vehicle having a start/stop engine, comprising the steps, in order, of:
    entering an automatic stop event;
    in response to the blower speed being above a first limit, ramping the blower speed to the first limit;
    comparing an evaporator temperature to a restart threshold, and in response to the evaporator temperature being above the restart threshold then initiating a termination of the automatic stop event;
    in response to the evaporator temperature continuing to be below the restart threshold after the blower speed reaches the first limit, then comparing an ambient temperature to a temperature threshold, and in response to the ambient temperature being less than the temperature threshold, then performing, in order, the steps of:

Comparing the evaporator temperature to an arrest threshold; and in response to the evaporator temperature rising above the arrest threshold then ramping the blower speed to an arrested limit wherein the arrested limit is lower than the first limit.

* * * * *